(12) United States Patent
Worlitz et al.

(10) Patent No.: US 9,302,601 B2
(45) Date of Patent: Apr. 5, 2016

(54) VEHICLE SEAT

(71) Applicant: Faurecia Autositze GmbH, Stadthagen (DE)

(72) Inventors: Claudia Worlitz, Hannover (DE);
Christian Neyrinck, Stadthagen (DE);
Richard Harman, Cheshire (GB);
Beniot Gazaniol, Arpajon (FR)

(73) Assignee: Faurecia Autositze GmbH (DE)

( * ) Notice: Subject to any disclaimer, the term of this patent is extended or adjusted under 35 U.S.C. 154(b) by 624 days.

(21) Appl. No.: 13/723,321

(22) Filed: Dec. 21, 2012

(65) Prior Publication Data

US 2013/0187419 A1 Jul. 25, 2013

(30) Foreign Application Priority Data

Dec. 24, 2011 (DE) .................... 20 2011 109 531 U

(51) Int. Cl.
*A61M 11/00* (2006.01)
*B60N 2/44* (2006.01)
*A61H 9/00* (2006.01)

(52) U.S. Cl.
CPC *B60N 2/448* (2013.01); *A61H 9/00* (2013.01); *A61H 2201/0134* (2013.01)

(58) Field of Classification Search
CPC ....... A61H 9/00; A61H 9/0007; A61H 9/005; A61H 9/0078; A61H 2201/0103; A61H 2201/0107; A61H 2201/0134; A61H 2201/0149; A61H 2201/1409; A61H 2201/1623; A61H 2201/1633; A61H 2201/1664; A61H 2203/0425; A61H 2203/0431; A61H 2205/081; B60N 2/448

USPC .......... 601/98, 101–11, 148–152; 297/284.3, 297/284.6; 5/710, 713
See application file for complete search history.

(56) References Cited

U.S. PATENT DOCUMENTS

| 3,974,827 | A | * | 8/1976 | Bodeen | A47C 7/467 |
| | | | | | 128/DIG. 20 |
| 4,186,734 | A | * | 2/1980 | Stratton | 601/148 |
| 4,555,140 | A | * | 11/1985 | Nemoto | 297/452.54 |
| 4,761,011 | A | * | 8/1988 | Sereboff | A47C 4/54 |
| | | | | | 297/284.3 |
| 5,529,377 | A | * | 6/1996 | Miller | B60N 2/4415 |
| | | | | | 297/284.6 |
| 6,014,784 | A | * | 1/2000 | Taylor et al. | 5/713 |
| 6,592,533 | B1 | * | 7/2003 | Yonekawa | A47C 4/54 |
| | | | | | 601/148 |
| 2004/0097854 | A1 | * | 5/2004 | Hester | A61H 23/04 |
| | | | | | 601/149 |
| 2005/0177952 | A1 | * | 8/2005 | Wilkinson et al. | 5/713 |
| 2006/0217644 | A1 | * | 9/2006 | Ozaki et al. | 601/148 |
| 2011/0068611 | A1 | | 3/2011 | Maeda et al. | |

* cited by examiner

*Primary Examiner* — Steven Douglas

(57) ABSTRACT

A vehicle seat having at least one cushion element including a foam layer (1, 1'), a cover (2) and a massage device (3), wherein the massage device (3) includes one or more fluid fillable, hollow elements (3a) that are located in open recesses (1a, 1a') of the cushion elements (1, 1') facing the cover (2) and are designed such that when filled with fluid, the mechanical expansion of the hollow elements (3) that effect the massaging force on the vehicle seat occupant expands toward the cover (2) and is supported by a support element (4) in a direction that faces away from the cover (2), and wherein the support element (4) is arranged such that it introduces the mechanical force resulting from the expansion of the hollow element (3a) and pointing away from the cover (2) into the at least one (1) and/or both the cushion elements (1, 1').

4 Claims, 7 Drawing Sheets

VEHICLE SEAT

TECHNICAL FIELD

The invention relates to a vehicle seat and more particularly, to a vehicle seat having a support element on which the hollow element that is to be filled with fluid can be supported, is provided in the cushion element, which is preferably designed as a layer, e.g., as a foam layer.

BACKGROUND INFORMATION

A seat of the generic kind is known, for example, from US 2011068611. It contains a seat cushion that includes a passage opening that houses hollow elements, which can be filled with fluid and are designed as pneumatic bubbles or chambers and part of a massage system. On the side of the bubble that faces away from the seat cover, they are supported by the seat structure in order to build up a respective counter-pressure when the bubbles are filled. The fill fluid is essentially considered to be air but a gel or a liquid is possible as well.

The disadvantage of the known design is that the bubbles must be guided through the entire cushioning in order to introduce the force that acts upon them into the seat structure.

It is the objective of the present invention is to create a vehicle seat of the aforementioned kind whereby the hollow, fluid-fillable element does not require the support of the seat structure and still enables sufficient pressure transfer during the massaging process.

SUMMARY

According to the invention, a support element, on which the hollow element that is to be filled with fluid can be supported, is provided in the cushion element, which is preferably designed as a layer, e.g., as a foam layer. The force that acts upon the vehicle occupant when the massage equipment is activated is transferred via the hollow element that can be filled with fluid and that is guided by the foam to the support element and from there into the at least one cushion element. Thus, no complex dissipation of the forces into the seat structure is required, yet sufficient force is available for the massaging procedure.

Preferably, the support element is a fabric, in particular a carpet or a nonwoven or a synthetic component. It is of sufficient rigidity and expands when force acts upon it such that it can take up the force exerted by the fluid-fillable, hollow element, which is preferably a flexible or non-flexible fluid-tight bubble, and can dissipate said force into the surrounding cushion element, in particular into the surrounding foam.

According to one advantageous embodiment, a pressure element is located between the cover and the hollow element. This increases the force exerted for massaging purposes by the fluid-fillable, hollow element onto the vehicle passenger, such that a significantly more effective massage becomes possible. For this purpose, the pressure element can be molded onto the hollow element and/or connected to it. In addition, the pressure element can taper off toward the cover in order to transfer the force in a more selective or focused manner. The pressure element can also be attached to the cover and taper off in particular toward the hollow element. Furthermore, the pressure element can exhibit in particular a flat element that can be designed according to the desired massaging effect. Such a flat element can be made, for example, of leather or plastic. This increases the effective massage area.

According to one advantageous embodiment, the hollow element can be enclosed by a protective casing. It is made, for example, of plastic and during operation prevents that parts of the cushion element that surround the fluid-fillable, hollow element to enter into areas of the hollow element and thus interrupt the massaging function. This protective casing can be connected to the support element.

Finally, a fluid-filling device can be provided. It comprises in particular of a valve block for controlling the fluid supply and/or discharge and/or the fluid supply and/or discharge lines that connect the valve block with the hollow element. According to the invention, this fluid-filling device or parts thereof can be integrated in the at least one cushion element in a similar manner as the hollow element itself.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
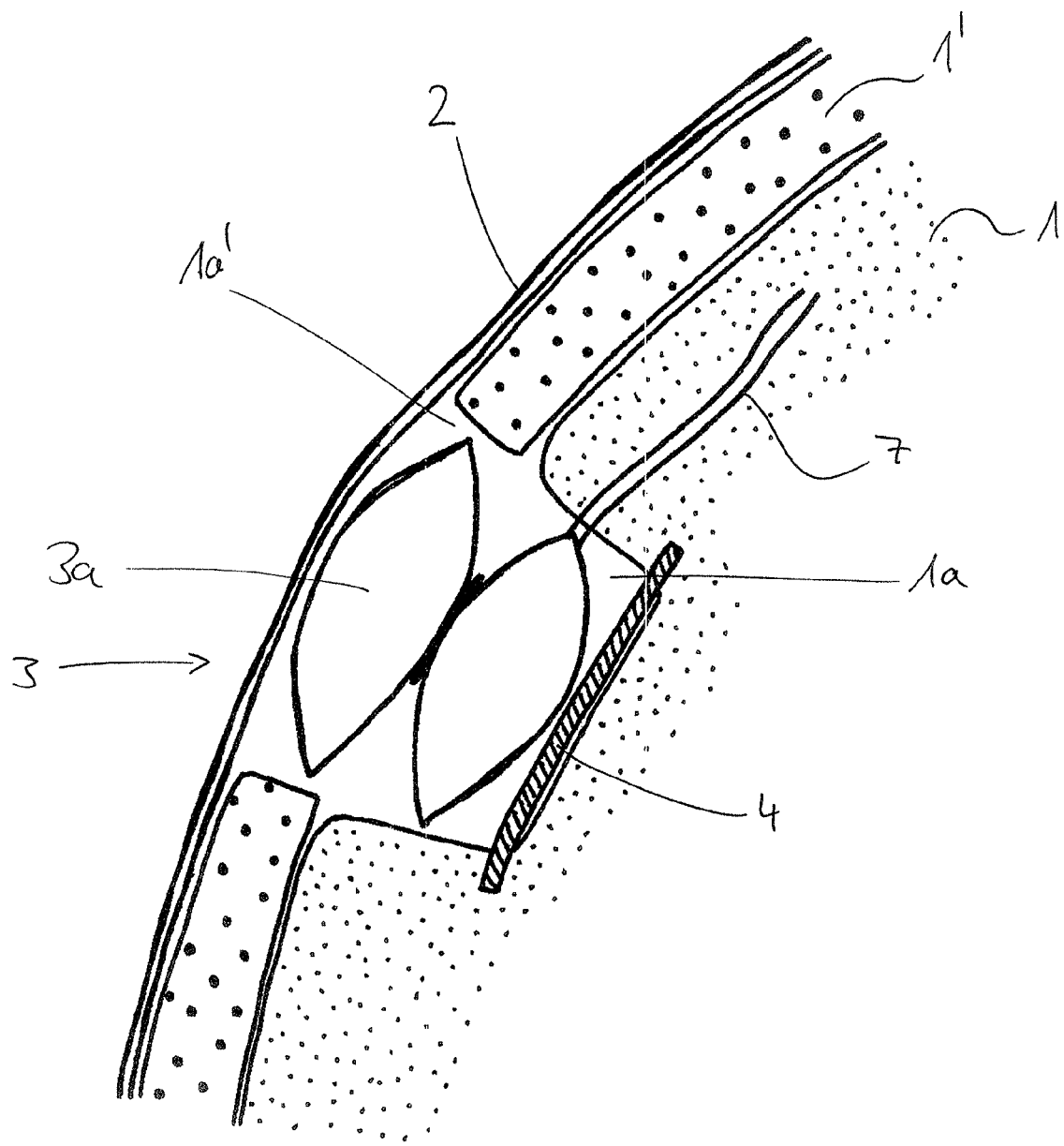
FIG. 1 shows a section of a vehicle seat according to the invention according to a first embodiment of the present invention.

Essentially, all figures show a similar section of a part of the vehicle seat (e.g., seat section or back rest) that is facing the vehicle occupant. The reference characters are accordingly identical and essentially designate similar components.

In FIG. 1, the character 1 designates a first cushion layer or foam layer and 1' designates an additional cushion layer or foam layer (hereinafter "layer" for short). The term "foam" will be used hereinafter. However, the foam layer can be any other suitable cushion element that does not include foam. Below, the term "foam layer" is not meant to be restrictive and can be understood as a cushion layer of any construction. Provided is a cover 2 that covers the layer 1 which is located at the side facing the vehicle occupant. Layers 1 and 1' exhibit a recess 1a' or an indentation 1a into which a fluid-fillable, hollow element 3a (hereinafter "bubble" for short) can be inserted, and which is part of a massage equipment 3. A support element 4 that is preferably attached to the layer 1, or in any case is placed in the bottom of the recess 1a, is provided on the side of the bubble 3a that is facing away from the cover 2. The support element 4, which can be made of plastic, a nonwoven, a carpet or the like dissipates the force that is applied via the vehicle occupant onto the cover 2 and the bubble 3a located underneath it during the massage procedure. Thus, sufficient pressure for the massage can be applied. The supply and discharge lines 7 for filling or emptying the bubble 3a can be integrated in layers 1 or/and 1'.

Figure 2:
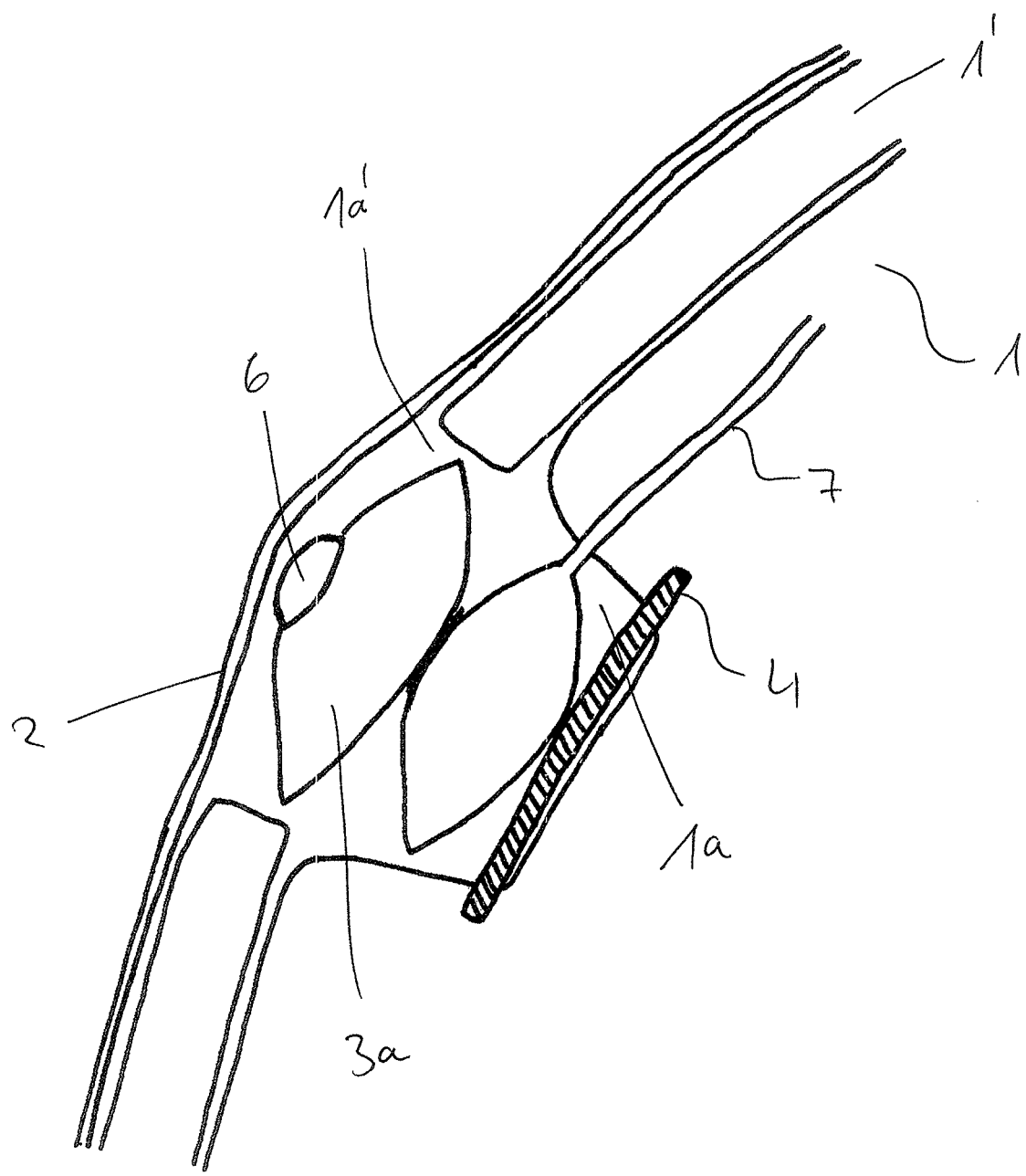
FIG. 2 shows a section of a vehicle seat according to the invention according to a second embodiment of the present invention.

The embodiment shown in FIG. 2 differs from the one shown in FIG. 1 in that a pressure element 6 is provided between the bubble and the cover. This modifies the pressure that acts upon the vehicle occupant.

In the shown example, the pressure surface of the bubble is reduced by a pressure element that tapers off toward the cover, whereby the force is bundled and transferred in a focused manner onto the vehicle occupant.

An alternative embodiment is shown in FIG. 1. Here, the bubble 3a is placed into the recess 1a or the hollow element between the layers 1 and 1'. The support element 4 is attached at the layer 1' that faces the seat structure.

Figure 3:
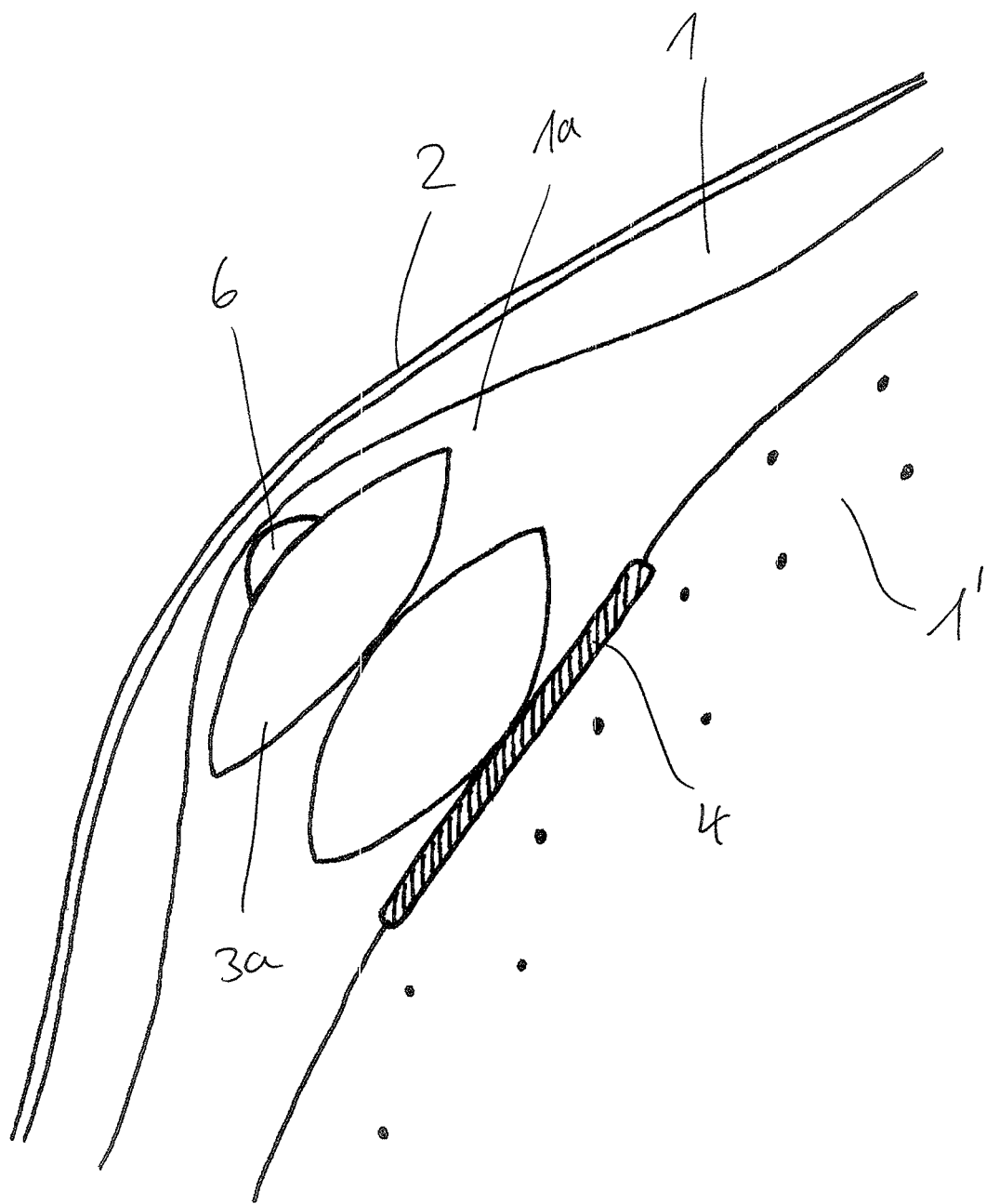
FIG. 3 shows a section of a vehicle seat according to the invention according to a third embodiment of the present invention.
Figure 4:
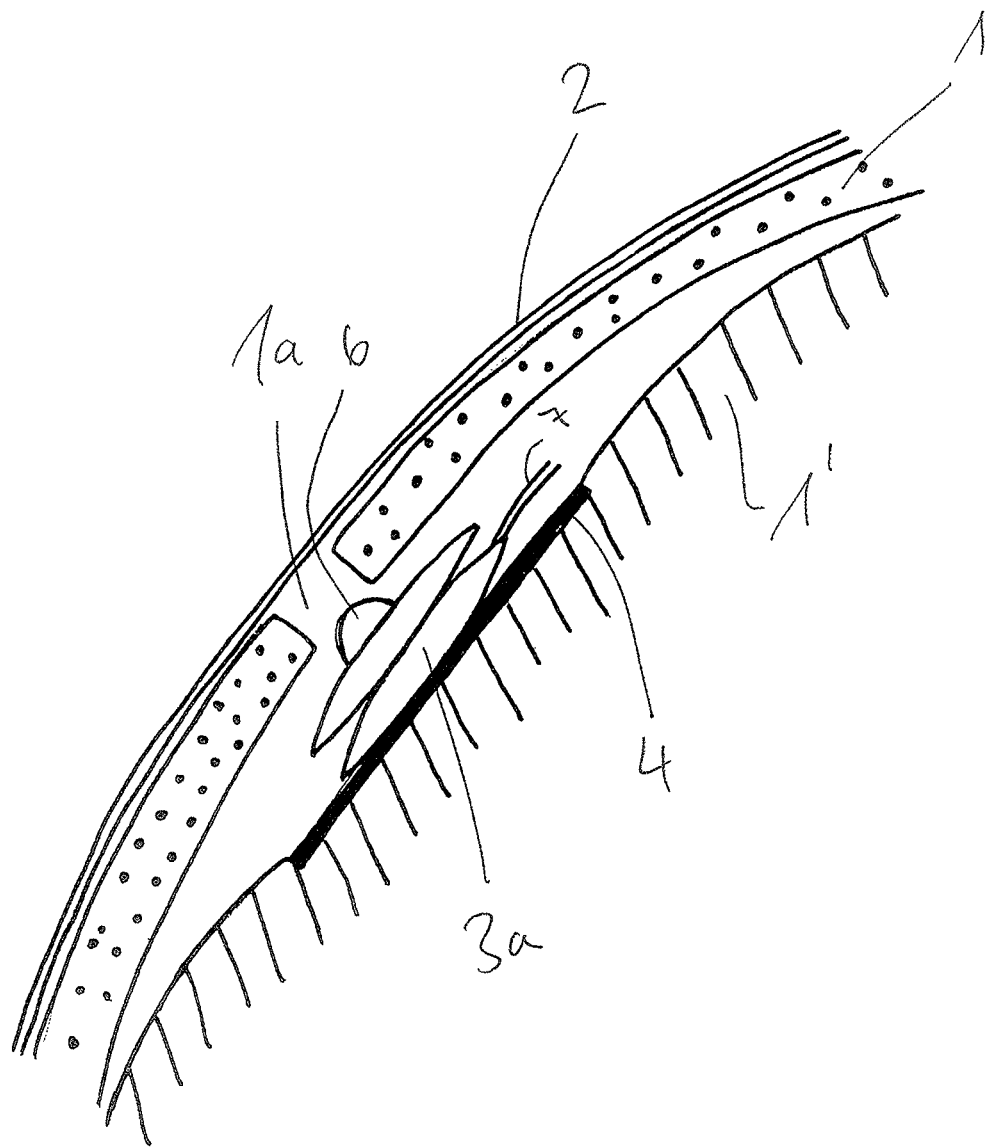
FIG. 4 shows a section of a vehicle seat according to the invention according to a fourth embodiment of the present invention.

A modification of the embodiment of FIG. 3 is shown in FIG. 4. There, a recess 1a is provided in the layer 1 facing the cover in the area of the bubble, where said recess is adapted to the size of the pressure element 6 and through which the pressure element 6 can be guided to the cover 2 during the massage procedure, which additionally increases the massage pressure compared to the embodiment of FIG. 3.

Figure 5:
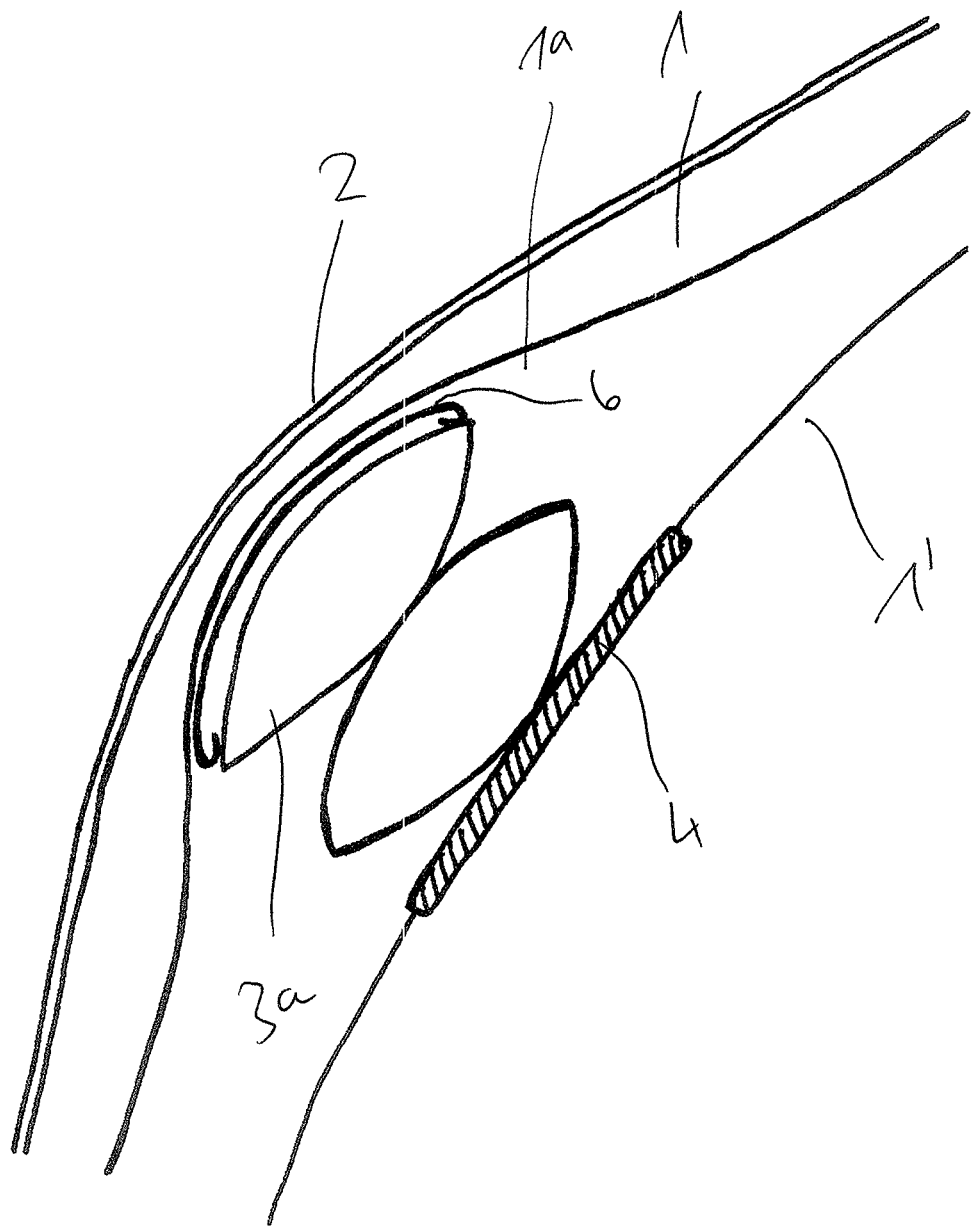
FIG. 5 shows a section of a vehicle seat according to the invention according to a fifth embodiment of the present invention.

Another alternative to FIG. 3 is shown in FIG. 5. Here, the pressure element 6 is designed as a flat element such that the force applied by the bubble 3a is distributed to a larger region as opposed to being focused as described above.

Figure 6:
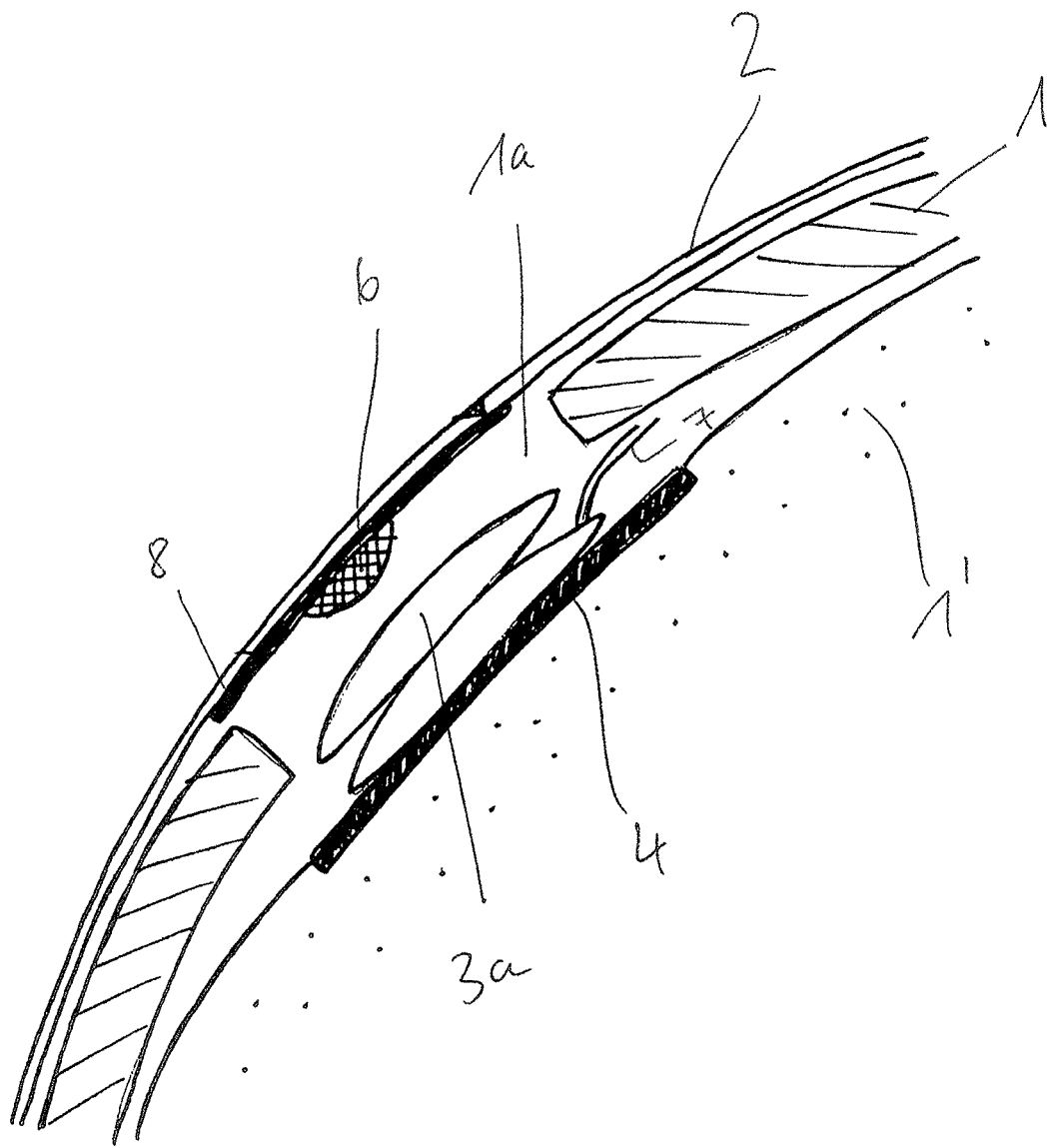
FIG. 6 shows a section of a vehicle seat according to the invention according to a sixth embodiment of the present invention.

The embodiment described in FIG. 6 exhibits a pressure element 6 that is connected to the cover 2. The layer 1 located under the cover 2 is provided with a recess 1a, that enables the region of the bubble 3a that faces the cover 2 to come in contact with the cover 2.

Between pressure element 6 and cover 2, at its inner side, a flat additional support element 8, for example made of leather or plastic, is provided; which on the one hand attaches to the cover 2 and on the other hand is attached to support element 6, which in the shown example tapers off toward the bubble 3a.

Figure 7:
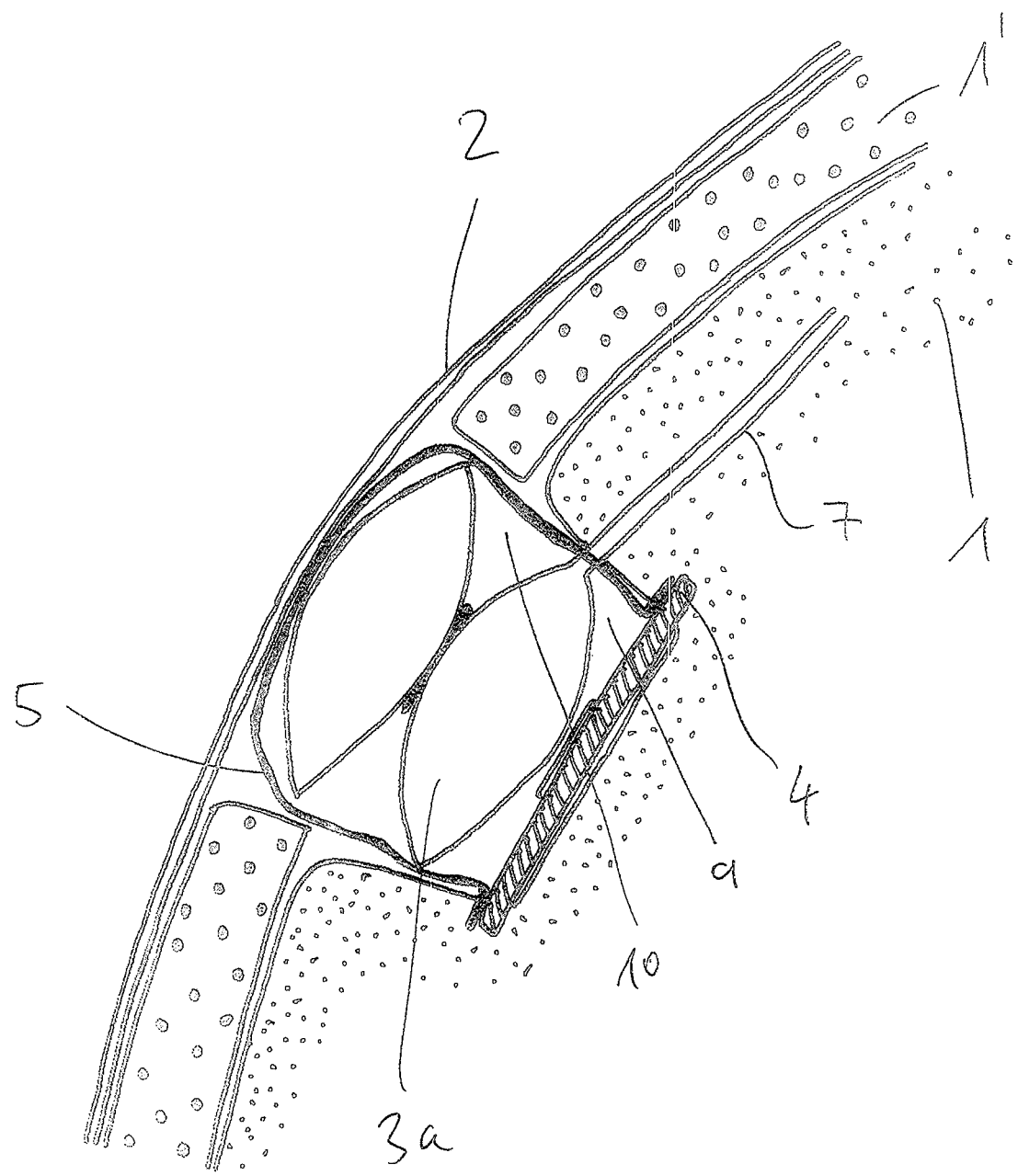
FIG. 7 shows a section of a vehicle seat according to the invention according to a seventh embodiment of the present invention.

Finally, FIG. 7 shows an additional embodiment that in particular can also be combined with the embodiments of FIGS. 2 to 6. In the shown example, it is a modification of the embodiment shown in FIG. 1. Different from FIG. 1, the bubble 3a is surrounded by a protective casing 5. Preferably, the protective casing 5 is attached to the support element 6. During the compression or expansion of the foam layers 1, 1', it is possible that the foam, due to its deformation, reaches into functional areas of the bubble, for example into the yield areas 9 or 10. This is prevented by the protective casing 5 such that the foam 1, 1' and the bubble do not interfere with each other when operating the massage equipment.

Modifications and substitutions by one of ordinary skill in the art are considered to be within the scope of the present invention, which is not to be limited except by the allowed claims and their legal equivalents.

The invention claimed is:

1. A vehicle seat having a massaging device, said vehicle seat comprising:
    at least one cushion element comprising at least one foam layer (1, 1'), a cover (2) and a massage device (3);
    wherein said massage device (3) comprises at least one fluid-fillable, hollow element (3a) disposed in an open recess (1a, 1a') of the at least one foam layer (1, 1'), said open recess (1a, 1a') facing the cover (2) and pre-formed in said at least one foam layer (1,1') prior to expansion of said hollow element (3a); and
    at least one support element disposed in a bottom region of said open recess (1a, 1a') in said at least one foam layer (1, 1') and fixedly attached to said at least one foam layer (1,1') preventing movement of said at least one support element prior to expansion of said at least one fluid-fillable, hollow element (3a);
    said at least one fluid-fill able, hollow element (3a) configured such that when filled with fluid, said at least one fluid-fillable, hollow element (3a) expands toward the cover (2) and in doing so is supported by said support element (4) in said bottom region of said open recess (1a, 1a') in a direction that faces away from the cover (2); and
    wherein the support element (4) is arranged such that it introduces a mechanical force resulting from the expansion of the hollow element (3a) and pointing away from the cover (2) into the at least one foam layer (1, 1').

2. The vehicle seat as set forth in claim 1, characterized in that the support element (4) is a fabric, selected from the group of fabrics consisting of a carpet, a nonwoven fabric and a synthetic fabric.

3. The vehicle seat as set forth in claim 1, characterized in that said at least one fluid-finable, hollow element (3a) is surrounded by a protective casing (5) connected to the support element (4).

4. The vehicle seat as set forth claim 1, further including fluid-filling device comprising a valve block, configured for controlling fluid supply and fluid discharge into and out of a fluid supply and discharge line (7) disposed in said at least one cushion element (1, 1').

* * * * *